United States Patent [19]
Van House et al.

[11] 3,837,711
[45] Sept. 24, 1974

[54] ANTI-LOCK BRAKE PRESSURE MODULATOR

[75] Inventors: Robert M. Van House; Jimmy C. Mayne, both of Dayton, Ohio

[73] Assignee: General Motors Corporation, Detroit, Mich.

[22] Filed: May 9, 1973

[21] Appl. No.: 358,713

[52] U.S. Cl............. 303/21 F, 188/181 A, 303/10
[51] Int. Cl............................................. B60k 8/06
[58] Field of Search........ 303/21 F, 6 R, 10, 61–63, 303/68–69; 188/181 A

[56] References Cited
UNITED STATES PATENTS

| | | | |
|---|---|---|---|
| 3,401,987 | 9/1968 | Horvath.............................. | 303/21 F |
| 3,495,882 | 2/1970 | Stelzer................................ | 303/21 F |
| 3,586,386 | 6/1971 | Trocme............................... | 303/21 F |
| 3,592,514 | 7/1971 | DeHoff................................ | 303/21 F |
| 3,617,099 | 11/1971 | Sugiyama........................... | 303/21 F |
| 3,623,778 | 11/1971 | Horvath.............................. | 303/21 F |
| 3,637,057 | 1/1972 | Okamoto............................ | 303/21 F |
| 3,719,400 | 3/1973 | Schenk............................... | 188/181 A |

*Primary Examiner*—Duane A. Reger
*Assistant Examiner*—Galen L. Barefoot
*Attorney, Agent, or Firm*—D. D. McGraw

[57] ABSTRACT

A brake pressure modulator includes a housing having a bore in which a piston is slidably movable and divides the bore into an outlet chamber communicating with the master cylinder and an outlet chamber communicating with the wheel brakes. A passage in the piston connects the inlet and outlet chambers to permit free fluid communication between the master cylinder and the wheel brakes during normal brake actuation. A plunger operatively associated with a fluid motor extends sealingly through the housing and into the outlet chamber. Brake fluid pressure in the outlet chamber urges the plunger outwardly of the outlet chamber and the fluid motor into engagement of the housing to support the plunger against movement by the brake pressure from a normal position. A valve arrangement is provided to close the passage in the piston upon movement of the plunger from the normal position by a pressure differential acting on the fluid motor in response to a sensed incipient wheel lock condition. Further movement of the plunger forcibly moves the piston to decrease the volume of the inlet chamber and increase the volume of the outlet chamber so that the brake fluid pressure communicated to the wheel brake is decreased. The fluid motor reciprocates the plunger and piston to cyclically release and reapply the brakes. Upon termination of the sensed wheel condition the plunger and fluid motor return to the normal position separated against movement by the brake pressure by engagement with the housing.

5 Claims, 4 Drawing Figures

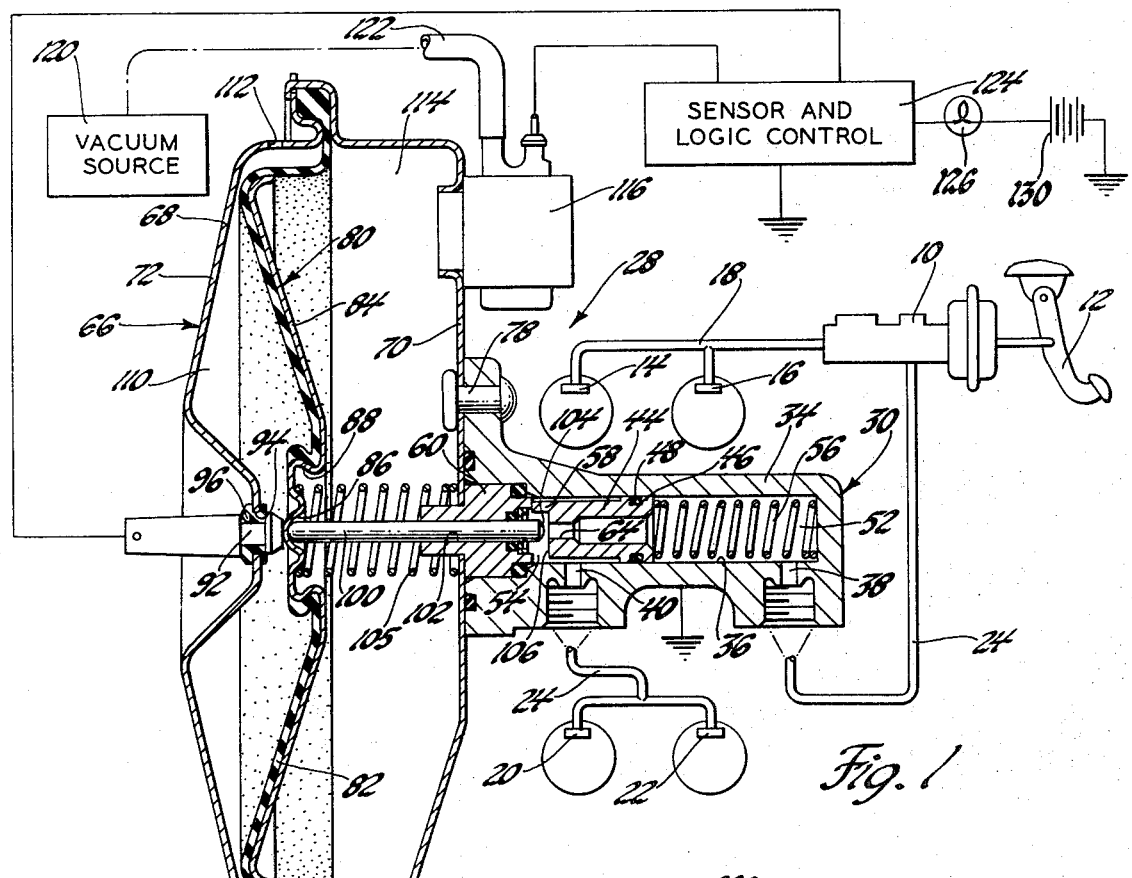

ANTI-LOCK BRAKE PRESSURE MODULATOR

The invention relates to a brake pressure modulator and more particularly to a modulator for installation fluidly intermediate a master cylinder and a vehicle wheel brake for cyclically releasing and reapplying the brake pressure to the wheel brakes in response to a sensed wheel condition.

It is known to provide a brake pressure modulator fluidly intermediate the master cylinder and the wheel brake to cyclically release and reapply the brake pressure to the wheel brakes in response to a sensed incipient wheel lock condition.

Such a brake pressure modulator typically includes a housing having a check valve mounted therein to divide the housing into an inlet chamber in fluid communication with the master cylinder and an outlet chamber in fluid communication with the wheel brake. A plunger operatively connected to a pressure operated fluid motor extends into the outlet chamber and has a normal position holding the check valve unseated to permit free fluid communication between the master cylinder and wheel brake. A wheel condition sensing and a control logic unit provides a fluid pressure variation on the fluid motor to cause withdrawal of the plunger from the housing to sequentially allow seating of the check valve to block communication from the master cylinder to the wheel brake and then decrease the fluid pressure at the wheel brake by increasing the volume of the outlet chamber. The logic control then cyclically reverses the pressure variation on the fluid motor to forcibly move the plunger to decrease the volume of the outlet chamber and then again increase the volume of the outlet chamber to release the brakes. Upon termination of the sensed wheel condition the fluid motor and plunger are returned to their normal position wherein the check valve is opened to restore free fluid communication between the master cylinder and wheel brakes.

The aforedescribed prior art brake pressure modulator requires the constant maintenance of a pressure differential upon the fluid motor to support the plunger in the outlet chamber against the brake pressure acting on the plunger so that the check valve may be held in open position. Inasmuch as a source of such a fluid pressure is not always conveniently available in motor vehicles, particularly when the vehicle engine is not in operation, it is necessary to provide a spring in the modulator which acts upon the fluid motor or plunger to support the plunger in its normal position against movement by the brake pressure acting on the end thereof disposed in the outlet chamber.

The capacity of the modulator to increase and decrease the wheel brake pressure is, of course, a function of the volumetric change of the outlet chamber provided by movement of the plunger therein. In order to provide this volumetric change, it is desirable to provide a plunger having a large end diameter extending into the outlet chamber to provide a large volumetric change with a minimum of plunger movement. It has accordingly been found necessary to provide a supporting spring of large capacity for supporting the plunger against movement by the brake fluid pressure acting on the large end area thereof disposed in the outlet chamber. In order to decrease the amount of support necessary for the plunger, it is desirable to provide a plunger of relatively small diameter, but then a fluid motor must be provided having a relatively long stroke in order to provide the necessary volumetric change. In either case, the result is a modulator housing and supporting spring of considerable size and strength.

One feature of the present invention is the provision of a modulator in which the pressure operated fluid motor engages the housing during normal brake actuation to support the plunger against movement by brake fluid pressure acting on the end thereof.

Another feature of the invention is the provision of a plunger having a relatively small end diameter to minimize the need for support thereof and a relatively large diameter piston which is forcibly engaged by the plunger for reciprocating movement to provide the necessary change in chamber volume to cyclically release and reapply the brake pressure.

A further feature of the invention is the provision of a modulating piston having a fluid passage therethrough communicating the master cylinder to the wheel brakes and a plunger movable to close the fluid passage in the piston and forcibly move the piston to vary the brake pressure.

A still further feature of the invention is the provision of an electrical contact integral with the housing and engaged by the fluid motor when in the normal position to provide a switch for indicating the normal condition of the modulator.

A brake pressure modulator according to the present invention includes a modulating section and a fluid motor section. The modulating section includes a housing having a bore in which a modulating piston is sealingly slidable to divide the bore into an inlet chamber communicating with the master cylinder and an outlet chamber communicating with the wheel brakes. A passage in the piston permits free fluid communication between the master cylinder and the wheel brakes during normal brake actuation. The fluid motor section of the modulator includes a housing in which a pressure operated fluid motor, such as a diaphragm, is movable by fluid pressure variations communicated thereto. A plunger operatively associated with the fluid motor extends sealingly through the housing and in to the outlet chamber of the modulating section. The brake fluid pressure within the outlet chamber acts on the end area of the plunger within the outlet chamber urging the plunger outwardly of the chamber. The fluid motor engages the housing to support the plunger against movement by the brake pressure fluid acting thereon to define the normal position of the fluid motor and the plunger. A wheel condition sensing and control logic unit operates a control valve to provide a pressure differential on the fluid motor in response to a sensed incipient wheel lock condition. This pressure differential acting on the fluid motor forcibly moves the plunger into the outlet chamber.

In the preferred embodiment of the invention the end of the plunger forms a valve member which, upon movement of the plunger from the normal position, engages and closes a valve seat formed by the wall of the piston defining the passage thereof. Closure of this valve blocks communication between the master cylinder and wheel brakes. Further movement of the plunger into the outlet chamber forcibly moves the piston to decrease the volume of the inlet chamber and increase the volume of the outlet chamber whereby the fluid pressure communicated to the wheel brake is decreased. Pressure variations caused by the wheel condition sensor and control logic then cyclically reciprocate the plunger and piston to cyclically reapply and release the wheel brake. Upon termination of the sensed wheel condition the pressure differential is removed from the fluid motor and the brake fluid pressure in the outlet chamber returns the plunger and fluid motor to the normal condition wherein the fluid motor engages the housing to support the plunger against movement by the brake fluid pressure in the outlet chamber. The plunger is of a relatively small end area so as to minimize the support force which the housing must provide. The modulating piston is of a relatively larger diameter so as to provide the necessary volumetric changes in the outlet chamber with a minimum of travel. An electrical contact is mounted in the housing at the point of its engagement by the fluid motor to provide a switch which is closed when the fluid motor is in the normal position engaging the housing. In the drawings:

FIG. 1 is a cross-sectional view of a pneumatically operated brake pressure modulator embodying the invention shown with a schematic vehicle brake system.

FIG. 2 is a partial cross-sectional view of a second embodiment of the invention;

FIG. 3 is a partial cross-sectional view of a third embodiment of the invention; and FIG. 4 is a partial cross-sectional view of a fourth embodiment of the invention.

Referring to FIG. 1, it will be seen that the vehicle brake system includes a booster and dual master cylinder assembly 10 operated by an operator actuated pedal 12 and providing pressurized fluid to front wheel brakes 14 and 16 via conduit 18 and to rear wheel brakes 20 and 22 via conduit 24. A brake pressure modulator, generally indicated at 28, has a hydraulic modulating section, generally indicated at 30 interposed in conduit 24 fluidly intermediate the booster and master cylinder assembly 10 and the rear wheel brakes 20 and 22.

The hydraulic section 30 of modulator 28 includes a housing 34 having a bore 36. An inlet port 38 communicates booster and master cylinder assembly 10 and conduit 24 to the bore 36. An outlet port 40 communicates the wheel brakes 20 and 22 and conduit 24 to the bore 36. A modulating piston 44 has a land 46 which engages bore 36 and carries a seal 48 so as to be sealingly slidable in the bore 36. The modulating piston 44 divides the bore 36 into an inlet chamber 52 communicated to inlet port 38 and an outlet chamber 54 communicated to the outlet port 40. A coil compression spring 56 acts between the housing 34 and the modulating piston 44 to urge the modulating piston 44 to its normal position wherein a projection 58 of the modulating piston 44 engages a plug 60 which is sealingly retained in the housing 34 to close the end of bore 36. It will be noted that in this normal position modulating piston 44 provides an inlet chamber 52 of maximum size and an outlet chamber 54 of minimum size. A passage 64 in the modulating piston 44 connects the inlet chamber 52 and outlet chamber 54 to provide free fluid communication between the booster and master cylinder assembly 10 and the wheel brakes 20 and 22.

The brake pressure modulator 28 also includes a fluid motor section indicated generally at 66. The fluid motor section 66 includes a stamped sheet metal housing 68 including portions 70 and 72 connected together at their respective peripheral flanges 74 and 76 by a conventional bayonet type attachment. Portion 70 of housing 68 is attached to housing 34 of the modulating section 30 as by a rivet 78. A pressure operated fluid motor, generally indicated at 80, is provided within housing 68 and includes a diaphragm 82 and support plate 84. The flanges 74 and 76 of the housing portions capture a peripheral bead 85 of the diaphragm 82 to mount the diaphragm 82 within the housing 68. Diaphragm 82 is supported by the support plate 84 which has a central cupped portion 86 extending through a central opening 88 of diaphragm 82. An electrical contact 92 is mounted in a central opening 94 of the housing portion 72 by an insulating collar 96. A plunger or actuating member 100 has one end engaged in the cupped portion 86 of the support plate 84 and the other end 104 extending sealingly through a bore 102 of the plug 60 and into the outlet chamber 54 of the modulating section 30. Brake fluid pressure within outlet chamber 54 urges the plunger 100 leftwardly as viewed in FIG. 1 to its normal position in which the support plate 84 of fluid motor 80 engages electrical contact 92 to support the plunger 100 against further leftward movement by the brake pressure acting on the end 104 thereof. In addition, a spring 105 acts between the housing portion 70 and support plate 84 to assist the brake pressure in urging the fluid motor 80 leftwardly and to hold the fluid motor 80 in this normal position during absence of fluid pressure in outlet chamber 54 when the master cylinder is not actuated.

Housing portion 72 and the fluid motor 80 comprised of diaphragm 82 and support plate 84 cooperate to define a chamber 110 which is communicated to the atmosphere through a vent 112. The housing portion 70 and the fluid motor 80 cooperate to define a second chamber 114 which is communicated to a conventional solenoid operated control valve 116. The control valve 116 normally communicates the chamber 114 to atmospheric pressure and is electrically actuable to connect the chamber 114 to a vacuum source 120, such as the engine manifold, via a conduit 122. The control valve 116 is operated by a wheel condition sensor and a control logic unit 124, which may be of the type disclosed in U.S. Pat. No. 3,547,501 by Harned et al., patented Dec. 15, 1970 and assigned to the assignee of this invention. The sensor and control logic senses the wheel condition and provides a control signal for actuation of the solenoid operated control valve in response to a sensed incipient wheel lock condition. Communication of vacuum to the chamber 114 introduces a pressure differential which moves fluid motor 80 rightwardly from its normal position of FIG. 1.

The plunger 100 is arranged coaxially with the passage 64 of modulating piston 44 so that upon rightward movement of plunger 100 by the fluid motor 80 the end 104 of plunger 100 in outlet chamber 54 sealingly engages a valve seat 106 provided by the wall of modulator piston 44 defining the passage 64, thereby blocking communication between inlet chamber 52 and outlet chamber 54. Further rightward movement of plunger 100 forcibly moves modulating piston 44 rightwardly thereby increasing the volume of outlet chamber 54 to decrease the pressure of the brake fluid trapped therein to release the wheel brakes 20 and 22. This rightward movement of modulating piston 44 displaces fluid from inlet chamber 52 and returns such fluid through the conduit 24 to the master cylinder 10. Upon reversal of the differential pressure upon the fluid motor 80 by again communicating atmospheric pressure to chamber 114, plunger 100 and modulating piston 44 will be moved leftwardly by the brake fluid pressure in inlet chamber 52 to decrease the volume of outlet chamber 54 and thereby increase the brake fluid pressure communicated to the wheel brakes 20 and 22. Inasmuch as the brake fluid pressure in inlet chamber 52 is greater than the brake fluid pressure in outlet chamber 54, the modulating piston 44 follows the plunger 100 in the leftward direction and holds the valve seat 106 in sealing engagement of the plunger end 104. In the event that the operator terminates actuation of the master cylinder 10 during operation of the modulator 28, modulating piston 44 will be moved rightwardly relative plunger 100 by the pressure differential between outlet chamber 54 and inlet chamber 56 to open passage 64 and permit return of fluid to the master cylinder.

The fluid pressure in outlet chamber 54 is cyclically increased and decreased in the aforedescribed manner to cyclically increase and decrease the brake pressure at the rear wheel brakes 20 and 22 until the incipient wheel lock condition is terminated. Plunger 100 and fluid motor 80 are then moved to their full leftward normal position of the FIG. 1 by the brake pressure in outlet chamber 54 and spring 105.

When the fluid motor 80 is in its normal position, the electrical contact 92 is connected to an electrical ground via the support plate 84, plunger 100, plug 60 and housing 34. Electrical contact 92 is electrically connected to the wheel sensor and control logic 124 to provide an indication that the fluid motor is in its normal position in readiness for operation. A circuit including a signal lamp 126 and battery 130 may be provided to give the driver a visual indication of a particular operating condition of the system.

It will be noted by reference to the drawings that the diameter of plunger 100 is small relative the diameter of the modulating piston 44. The relatively small diameter of plunger 100 presents a relatively small area of end 104 within the outlet chamber 54 so as to minimize the pressure force of the fluid in the outlet chamber 54 acting to urge the plunger 100 leftwardly. This in turn permits the housing 68 of the fluid motor section 66 to be of relatively light construction to support the plunger 100 against leftward movement by the brake fluid pressure. The modulating piston 44 is of relatively large diameter to provide a considerable volumetric change of outlet chamber 54 within a relatively short range of movement of the modulating piston 44 within the bore 36. This in turn minimizes the overall length of the brake pressure modulator 28 by minimizing the distance through which the fluid motor 80, plunger 100 and modulating piston 44 must move.

Referring to FIG. 2, a second embodiment of the invention is shown in a brake pressure modulator generally indicated at 140. The fluid motor section of the brake pressure modulator 140 is constructed similarly to the fluid motor section 66 of the brake pressure modulator 28 and accordingly has its like elements denoted by like numerals. The modulating section 142 of the brake pressure modulator 140 includes a housing 144 having a bore 146 communicated to the master cylinder by an inlet port 148 and to the wheel brakes by an outlet port 150. A modulating piston 154 is sealingly slidable in the bore 146 to divide the bore into an inlet chamber 156 and an outlet chamber 158. The modulating piston 154 has a stepped recess 162 opening into the inlet chamber 156 and a recess 164 opening into the outlet chamber 158. A piston 166 is slidable in the stepped recess 162 of modulating piston 154 and is urged by a coil compression spring 168 into a normal position wherein a flange 170 of the piston 164 engages the modulating piston 154 to in turn urge a face 172 of the modulating piston 154 into engagement of a plug 174 which is sealingly retained in the housing 144 to close the end of bore 146. When the piston 166 is in this normal position with respect to modulating piston 154, a pin 176 of the piston 166 extends through a passage 178 of the modulating piston 154 and into the recess 164. A ball valve 182 is captured in the recess 164 of the modulating piston 154 by an inwardly bent portion 184. The pin 176 prevents the ball valve 182 from engaging a valve seat 186 of the modulating piston 154 defined by the passage 178. Piston 166 has passages 188 which communicate with passage 178 via a chamber 190 to communicate the inlet chamber 156 with the outlet chamber 158.

When the plunger 100 is moved rightwardly by the fluid motor 80 in response to a sensed wheel condition as described hereinbefore with reference to FIG. 1, the plunger end 192 engages ball valve 182 which in turn engages pin 176 forcing piston 166 rightwardly as permitted by yielding of the spring 168. The ball valve 182 is seated against valve seat 186 to close passage 178 and thereby block fluid communication between the inlet chamber 156 and outlet chamber 158. Further rightward movement of plunger 100 forcibly moves modulating piston 154 rightwardly to increase the volume of outlet chamber 158. The modulating piston 154 may then be moved cyclically leftwardly and rightwardly to increase and decrease the wheel brake pressure. Eventual return of the plunger 100 to its normal position of FIG. 2 allows coil spring 168 and pin 176 to force ball valve 182 off the valve seat 186.

Referring to FIG. 3, a brake pressure modulator, generally indicated at 200, is shown having a modified modulating section generally indicated at 202. The modulating section 202 includes a housing 204 having a bore 206 sealingly closed at one end by a plug 208 and at the other end by a plug 210. A piston 212 is sealingly slidable in the bore 206 and divides the bore into an inlet chamber 214 connected to the master cylinder by an inlet port 216 in the plug 208 and an outlet chamber 218 connected to the wheel brakes by an outlet port 220. Modulating piston 212 is urged to a normal position in engagement of a shoulder 224 of the housing 204 by a coil compression spring 226. Modulating piston 212 has a central passage 228 which communicates the inlet chamber 214 to the outlet chamber 218. Modulating piston 212 has a stepped recess 230 opening into the inlet chamber 214. A resilient annular lip seal valve seat 231 is retained in the recess 230 by a retaining ring 232. The annular lip seal valve seat is preformed in a conical shape pointing toward the inlet chamber 214 and is truncated to provide a central opening 233.

A plunger 234 extends sealingly through the plug 210 and is operably associated with a fluid motor of the modulator fluid motor section as in FIGS. 1 and 2. The end of plunger 234 extends into the outlet chamber 218 and includes an abutment portion 236 and a pin 238. The plunger 234 is urged to its normal position of FIG. 3 by the fluid pressure in the outlet chamber 218 acting on the cross-sectional end area thereof. Upon rightward movement of the plunger 234 by the fluid motor in response to a sensed wheel condition as discussed with reference to FIG. 1, the pin 238 of the plunger 234 is thrust through the opening 233 of annular lip seal valve seat 231 to block fluid communication between inlet chamber 214 and outlet chamber 218. Further rightward movement of the plunger 234 brings the abutment portion 236 thereof into engagement of the modulating piston 212 to forcibly move the modulating piston 212 rightwardly to increase the volume of outlet chamber 218. The plunger 234 may then by cyclically reciprocated by the fluid motor as discussed with reference to FIG. 1 above to cyclically release and reapply the brake pressure to the wheel brakes. When the plunger 234 is returned leftwardly to its rest position of FIG. 3 the pin 238 is withdrawn from the annular lip seal valve seat 231 to reestablish fluid communication between the inlet chamber 214 and outlet chamber 218. The annular lip seal valve seat 132 is operative to block the passage 228 in cooperation with the pin 238 irrespective of axial misalignment of the pin 238 relative the annular lip seal 138.

Referring to FIG. 4, a brake pressure modulator modulating section, indicated generally at 244, embodying a fourth modification of the invention is shown. The modulating section 244 includes a housing 246 having a bore 248 communicated to the master cylinder by an inlet port 250 and to the wheel brakes by outlet port 252. A modulating piston 254 is sealingly slidable in the bore 248 and divides the bore into an inlet chamber 256 and an outlet chamber 258. A stepped recess 262 and a passage 264 of the modulating piston 254 communicate the inlet chamber 256 to the outlet chamber 258. A plug 266 is sealingly received in the housing 246 to close the end of bore 248. A plunger 268 extends sealingly through the plug 266 into the outlet chamber 258 and engages the modulating piston 254. The plunger 268 is operably connected to a fluid motor as in the embodiment of FIG. 1 and is shown in FIG. 4 urged to its normal leftwardmost position by the fluid pressure in outlet chamber 258. A ball valve 272 is captured within the recess 262 of modulating piston 254 by a retainer 274 and is urged by a spring 276 seated against the retainer into sealing engagement of a valve seat 278 defined by the wall of passage 264. A fixed pin 280 is force fit into the plug 266 and extends unsealingly through the passage 264 into engagement with the ball valve 272 to hold the ball valve 272 off the valve seat 278 when the modulating piston 254 is in its normal position as shown in FIG. 4 to permit free fluid communication between inlet chamber 256 and outlet chamber 258. When the plunger 268 is moved rightwardly by the fluid motor in response to the sensed wheel condition as discussed hereinabove with reference to FIG. 1, the modulating piston 254 is moved rightwardly to lift the ball 272 off the fixed pin 280 permitting the seating of the ball 272 on the valve seat 278 to block communication between chambers 256 and 258. Further rightward movement of the plunger 268 and modulating piston 254 increases the volume of outlet chamber 258 to decrease the fluid pressure at the wheel brakes. The plunger 268 may be cyclically reciprocated rightwardly and leftwardly to cyclically decrease and increase the fluid pressure at the wheel brakes as described hereinbefore. Upon eventual return of the plunger 268 to the leftward rest position of FIG. 4 the ball valve 272 will again be lifted off the seat 278 by the fixed pin 280. It will be noted that the modification of FIG. 4 eliminates the need for a coil compression spring to bias the modulating piston 254 to its normal position. Whenever the fluid pressure in the inlet chamber 256 exceeds the fluid pressure at outlet pressure 258 the modulating piston 254 will be carried leftwardly by that pressure differential so that the ball valve 272 is lifted off the valve seat 278 by the fixed pin 280.

Thus an improved brake pressure modulator is provided.

What is claimed is:

1. A brake pressure modulator comprising: a housing, a bore in the housing, a piston sealingly slidable in the bore and dividing the bore into an inlet chamber in communication with an operator actuated fluid pressure source and an outlet chamber in fluid communication with a wheel brake, a passage in the piston communicating the inlet chamber to the outlet chamber during normal brake actuation, a pressure operated fluid motor movable in the housing in response to fluid pressure variations acting thereon, an actuating member operatively associated with the fluid motor and sealingly slidably extending through the housing into the outlet chamber, the effective end area of the actuating member in the outlet chamber being less than the effective end area of the piston, fluid pressure in the outlet chamber acting on the actuating member to urge the fluid motor to a normal position in engagement of the housing to support the actuating member in a normal position and against further movement by the outlet chamber fluid pressure acting on the actuating member, valve means effective to close the passage in the piston upon movement of the actuating member from the normal position, and means providing a fluid pressure variation in response to a sensed wheel condition to forcibly move the fluid motor from the normal position in engagement with the housing and displace the actuating member to operate the valve means to close the passage in the piston and forcibly move the piston to decrease the volume of the inlet chamber and increase the volume of the outlet chamber whereby the fluid pressure communicated to the wheel brake is decreased.

2. A brake pressure modulator comprising a housing, a bore in the housing, longitudinally spaced inlet and outlet ports in the housing respectively connecting the bore to an operator actuated fluid pressure source and a wheel brake, a piston sealingly slidable in the bore between the inlet and outlet ports and dividing the bore into an inlet chamber and an outlet chamber, spring means urging the piston to a normal position in the bore relatively near the outlet port to provide an inlet chamber relatively larger than the outlet chamber, a passage in the piston connecting the inlet chamber and the outlet chamber, a pressure operated fluid motor movable in the housing in response to fluid pressure variations acting thereon, an actuating member operatively associated with the fluid motor and sealingly slidably extending through the housing into the outlet chamber, fluid pressure in the outlet chamber acting on the actuating member to urge the fluid motor to a normal position in engagement of the housing to support the actuating member in a normal position and against movement by the outlet chamber fluid pressure acting on the actuating member, valve means effective to close the passage in the piston upon movement of the actuating member from the normal position, said valve means including a valve surface on the actuating member being spaced from a valve seat on the piston when the actuating member and piston are in their respective normal positions, and means providing a fluid pressure variation in response to a sensed wheel condition to forcibly move the fluid motor and the actuating member from the normal position to carry the valve surface of the actuating member into sealing engagement of the valve seat to close the passage in the piston and upon further movement of the actuating member forcibly move the piston to decrease the volume of the inlet chamber and increase the volume of the outlet chamber whereby the fluid pressure communicated to the wheel brake is decreased.

3. A brake pressure modulator comprising: a housing; a bore in the housing; longitudinally spaced inlet and outlet ports in the housing respectively connecting the bore to an operator actuated fluid pressure source and a wheel brake; a modulating piston sealingly slidable in the bore between the inlet and outlet ports and dividing the bore into an inlet chamber and an outlet chamber; spring means urging the modulating piston to a normal position in the bore relatively near the outlet port to provide an inlet chamber relatively larger than the outlet chamber; a passage in the modulating piston connecting the inlet chamber and the outlet chamber; a pressure operated fluid motor movable in the housing in response to fluid pressure variations acting thereon; an actuating member operatively associated with the fluid motor and sealingly slidably extending through the housing into the outlet chamber; fluid pressure in the outlet chamber acting on the actuating member to urge the fluid motor to a normal position in engagement of the housing to support the actuating member in a normal position and against movement by the outlet chamber fluid pressure acting on the actuating member; valve means effective to close the passage in the modulating piston upon movement of the actuating member from the normal position; said valve means including a recess in the modulating piston opening toward the outlet chamber, a valve seat on the modulating piston in the recess thereof, a valve element captured in the recess and movable into engagement of the valve seat to block the passage, a piston member in the inlet chamber having a pin member extending unsealingly through the passage of the modulating piston, spring means urging the piston member to a normal position relative the modulating piston wherein the pin member extends into the recess to prevent seating of the valve element on the valve seat; and means providing a fluid pressure variation in response to a sensed wheel condition to forcibly move the fluid motor from the normal position and move the actuating member to carry the valve element into sealing engagement of the valve seat to close the passage in the modulating piston and upon further movement of the actuating member forcibly moving the modulating piston to decrease the volume of the inlet chamber and increase the volume of the outlet chamber whereby the fluid pressure communicated to the wheel brake is decreased.

4. A brake pressure modulator comprising: a housing; a bore in the housing; longitudinally spaced inlet and outlet ports in the housing respectively connecting the bore to an operator actuated fluid pressure source and a wheel brake; a piston sealingly slidable in the bore between the inlet and outlet ports and dividing the bore into an inlet chamber and an outlet chamber; spring means urging the piston to a normal position in the bore relatively near the outlet port to provide an inlet chamber relatively larger than the outlet chamber; a passage in the piston connecting the inlet chamber and the outlet chamber; a pressure operated fluid motor movable in the housing in response to fluid pressure variations acting thereon; an actuating member operatively associated with the fluid motor and sealingly slidably extending through the housing into the outlet chamber; fluid pressure in the outlet chamber acting on the actuating member to urge the fluid motor to a normal position in engagement of the housing to support the actuating member in a normal position and against movement by the outlet chamber fluid pressure acting on the actuating member; valve means effective to close the passage in the piston upon movement of the actuating member from the normal position; said valve means including a resilient annular seal carried by the piston and having a central aperture, pin means on the actuating member adapted to sealingly close the aperture of the annular seal when moved thereinto, and abutment means on the actuating member spaced from the piston when the actuating member and piston are in their normal position; and means providing a fluid pressure variation in response to a sensed wheel condition to forcibly move the fluid motor and the actuating member from the normal position to carry the pin into sealing closure of the aperture of the annular seal to close the passage in the piston and upon further movement of the actuating member engage the abutment means of the actuating member against the piston to forcibly move the piston to decrease the volume of the inlet chamber and increase the volume of the outlet chamber whereby the fluid pressure communicated to the wheel brake is decreased.

5. A brake pressure modulator comprising: a housing; a bore in the housing; longitudinally spaced inlet and outlet ports in the housing respectively connecting the bore to an operator actuated fluid pressure source and a wheel brake; a piston sealingly slidable in the bore between the inlet and outlet ports and dividing the bore into an inlet chamber and an outlet chamber; means urging the piston to a normal position in the bore relatively near the outlet port to provide an inlet chamber relatively larger than the outlet chamber; a passage in the piston connecting the inlet chamber and the outlet chamber; a pressure operated fluid motor movable in the housing in response to fluid pressure variations acting thereon; an actuating member operatively associated with the fluid motor and sealingly slidably extending through the housing into the outlet chamber; fluid pressure in the outlet chamber acting on the actuating member to urge the fluid motor to a normal position in engagement of the housing to support the actuating member in a normal position and against movement by the outlet chamber fluid pressure acting on the actuating member; valve means effective to close the passage in the piston upon movement of the actuating member from the normal position; said valve means including a valve seat on the piston, a valve element in the inlet chamber and movably mounted relative the piston, spring means urging the valve element into seating engagement of the valve seat to block the passage through the piston, fluid pressure in the inlet chamber urging the piston to a normal position in engagement of the actuating member, and means fixed on the housing in the outlet chamber and extending unsealingly through the passage to hold the valve element out of engagement with the valve seat when the piston and actuating member are in their normal positions; and means providing a fluid pressure variation in response to a sensed wheel condition to forcibly move the fluid motor and the actuating member from the normal position to forcibly move the piston relative the fixed means to permit seating of the valve element against the valve seat by the spring means to close the passage in the piston and upon further movement of the actuating member forcibly move the piston to decrease the volume of the inlet chamber and increase the volume of the outlet chamber whereby the fluid pressure communicated to the wheel brake is decreased.

* * * * *